United States Patent
Meredith et al.

[15] 3,642,370
[45] Feb. 15, 1972

[54] DOCUMENT PRESENTATION DEVICE

[72] Inventors: William Henry Palmer Meredith, 25 Higher Green, Ewell, England; Andre Vandeput, 151, Avenue Latinis, Brussels 3, Belgium

[22] Filed: June 26, 1968
[21] Appl. No.: 740,142

[30] Foreign Application Priority Data
June 30, 1967  Great Britain........................30,213/67

[52] U.S. Cl...................................355/75, 355/79, 355/8
[51] Int. Cl.........................................................G03b 27/62
[58] Field of Search....................355/3, 8, 12, 79, 75; 352/52

[56] References Cited

UNITED STATES PATENTS

| | | | |
|---|---|---|---|
| 3,544,212 | 12/1970 | Umahashi et al. | 355/42 |
| 1,198,598 | 9/1916 | Sudmann | 352/52 |
| 2,813,457 | 11/1957 | Fitzgerald | 355/79 |
| 2,889,758 | 6/1959 | Bolton | 355/14 |

*Primary Examiner*—Samuel S. Matthews
*Assistant Examiner*—D. J. Clement
*Attorney*—James J. Ralabate, John E. Beck and Laurence A. Wright

[57] ABSTRACT

Apparatus for forming composite images on a copy sheet for use with a document-copying machine having a light-emitting aperture over which a data-bearing overlay is automatically placed, the document presentation device comprising a transparent support for an original document and a web of graphic information containing overlays one of which is to be copied with the original document to form a composite image of the overlay and the original document. A portion of the overlay web is supported between the aperture of the copying machine and the original document for forming the composite image and is automatically programmed for moving the selected portion of the overlay into superposed position with the face of the original document.

6 Claims, 4 Drawing Figures

INVENTORS
WILLIAM H. P. MEREDITH
ANDRE VANDEPUT

ATTORNEY

DOCUMENT PRESENTATION DEVICE

BACKGROUND OF THE INVENTION

This invention relates in general to a document presentation device which may be used with a copying machine and in particular to an apparatus for automatically placing preselected portions of a graphic information bearing overlay into the optical path of a copying machine.

More specifically, this invention relates to an apparatus for forming composite images of an original document and an overlay by advancing preselected portions of an overlay bearing web into the optical path of a copying machine between the original document and its associated exposure system.

In many systems associated with copying machines it is required to copy a master document with various portions added or substracted to form a composite image, for example, to produce invoices, accounts and statements all of which are derived from the same basic information contained on the master document. One approach to solving this problem is to manually position an overlay, that is, a transparent medium containing opaque graphic data which is desired to be added to the master document, on the transparent platen of a copying machine and to superpose the master document thereon to copy this combination in a separate copying operation. However, such a procedure is not suitable for high speeds of copying and therefore an automatic system for presenting various overlays to the master document is highly desirable.

For example, this manual procedure could be carried out with an automatic xerographic reproducing machine of the type disclosed in C. R. Mayo, U.S. Pat. No. 3,062,109. This machine is used for reproducing from opaque originals which are placed on a transparent platen on the exterior of the machine frame.

The invention of this application permits the use of an automatic xerographic reproducing machine such as that disclosed in the aforementioned patent to be utilized for forming composite images from an overlay and a master document. However, it is not to be limited thereto but may be utilized with any machine having a transparent platen capable of supporting a master document to be reproduced.

SUMMARY OF THE INVENTION

It is, therefore, an object of this invention to improve automatic xerographic copying machines.

Another object of this invention is to improve automatic xerographic reproducing machines having a transparent platen for supporting a master document by automatically placing preselected graphic data bearing overlays into the optical path between the master document and the photoreceptive surface.

A further object of this invention is to improve automatic xerographic reproducing machines by automatically presenting portions of the graphic data bearing overlay in the form of an endless web into the optical path of the reproducing machine to form composite images of the overlay and a master document.

These and other objects are attained in accordance with the present invention wherein there is provided a document presentation device for use with an automatic document copying machine having a copying or light admitting aperture over which an item to be reproduced is placed, the apparatus including a transparent support for a master document, a web of graphic data containing overlays which are to be copied with the master document to form a composite image, and a preselectable programmer for driving the web of overlays to move selected overlays in turn into a position interposed between the document copying aperture and the master document.

DESCRIPTION OF THE DRAWINGS

Further objects of the invention, together with additional features contributing thereto and advantages accruing therefrom, will be apparent from the following description of one embodiment of the invention when read in conjunction with the accompanying drawings wherein.

DESCRIPTION OF A PREFERRED EMBODIMENT

Figure 1:
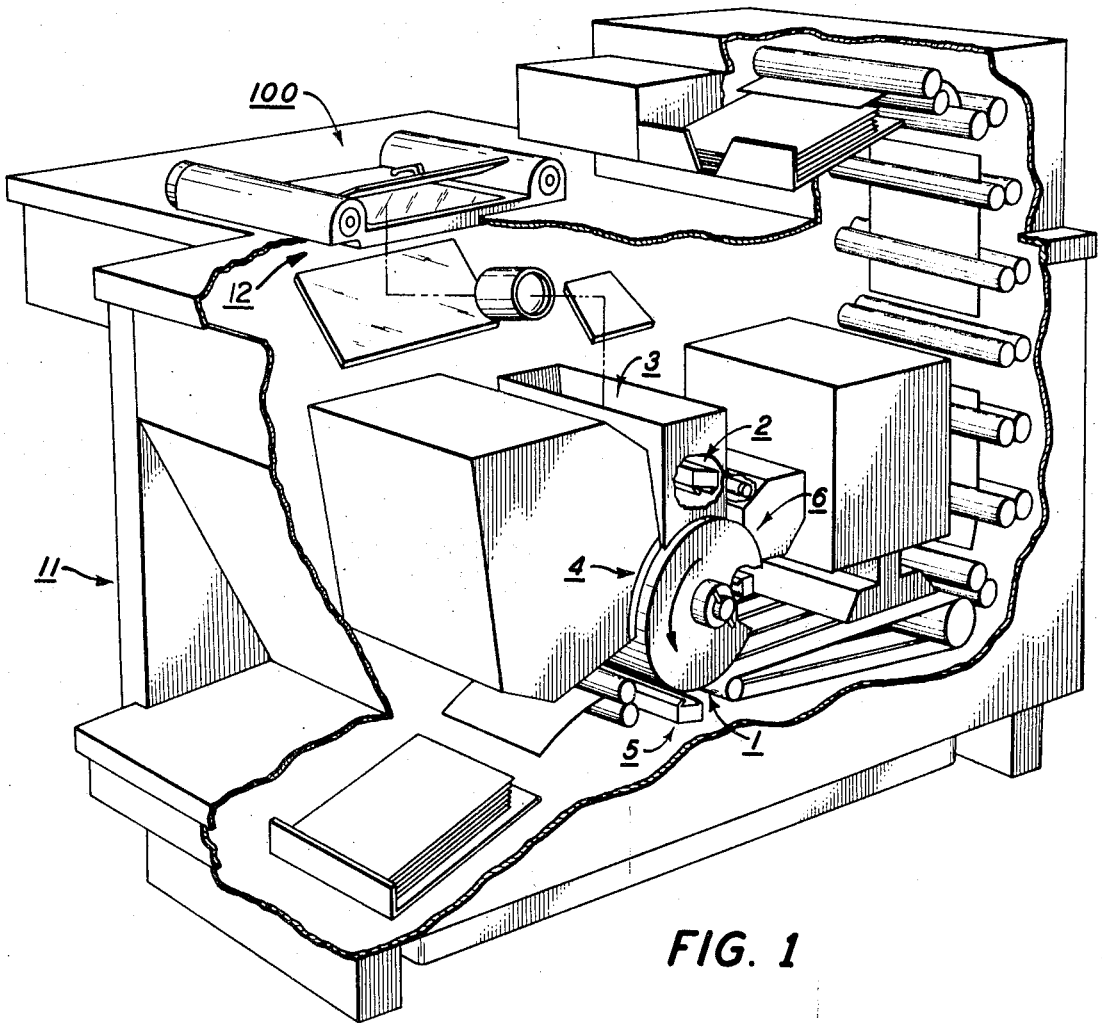
FIG. 1 is a perspective view of an automatic xerographic reproducing machine utilizing the invention of this application.
Figure 4:
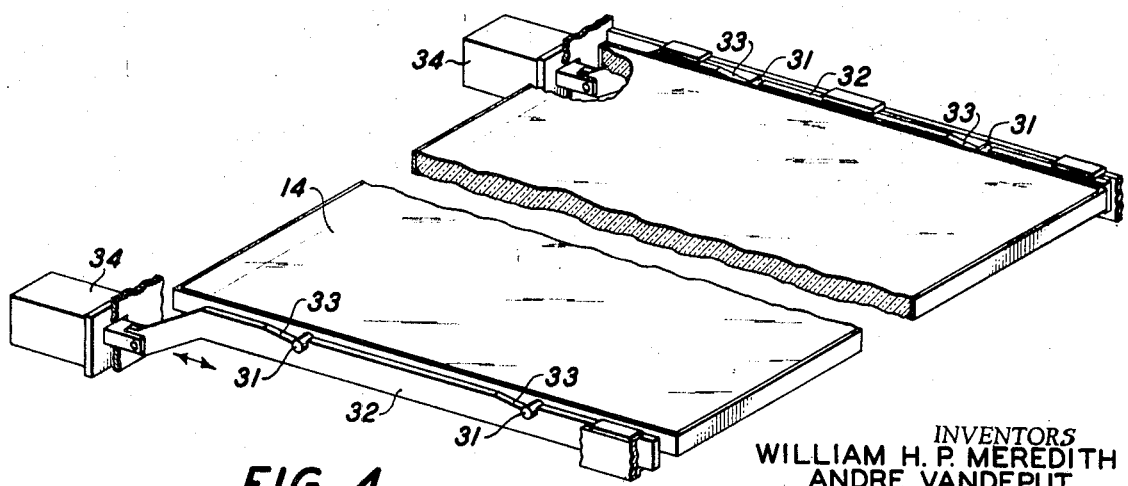
FIG. 4 is a perspective view of the mechanism for raising the copying platen to facilitate movement of the graphic information bearing overlay web.
Figure 2:
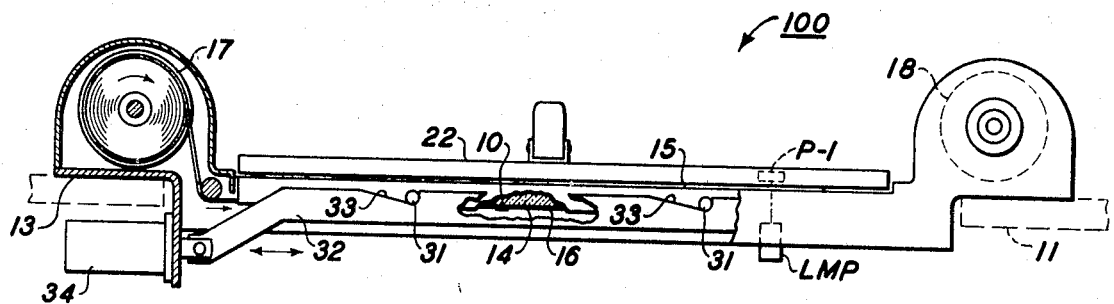
FIG. 2 is a partial section view of the invention of this application in operative position on the copying platen of the automatic xerographic reproducing machine illustrated in FIG. 1.

Referring now to the drawings, there is shown in FIG. 1 an automatic xerographic reproducing machine utilizing the invention of this application. The reproducing machine represented in FIG. 1 includes a xerographic plate 1 including a photoconductive layer or light-receiving surface on a conductive backing formed into an endless belt to rotate in the direction indicated by the arrow to cause the plate surface to sequentially pass a series of xerographic processing stations.

For the purposes of the present disclosure the several xerographic processing stations in the path of movement of the plate surface may be described functionally as follows:

a charging station 2 at which a uniform electrostatic charge is deposited on or in the photoconductive plate;

an exposure station 3 at which a light or radiation pattern of copy to be reproduced is projected onto the plate surface to dissipate the charge in the exposed areas thereof to thereby form a latent electrostatic image of the copy to be reproduced;

a developing station 4 at which the xerographic developing material, including toner particles having an electrostatic charge opposite to that of the latent electrostatic image, are applied to the plate surface whereby the toner particles adhere to the latent electrostatic image to form a toner powder image in configuration of the copy being reproduced;

a transfer station 5 at which the toner powder image is electrostatically transferred from the plate surface to a transfer material or a support surface; and a plate cleaning station 6 at which the plate surface is brushed to remove residual toner particles remaining thereon after image transfer, and exposed to a relatively bright light source to effect substantially complete discharge of any residual electrostatic charge remaining thereon or therein.

A copying machine 11 with which the document presentation device 100 is to be used has an aperture 12 through which the documents to be copies are scanned. Usually the aperture is covered by a transparent plate, but, the plate may be removed and the device placed directly over the aperture 12, and located relative to the aperture by a frame 13. A transparent plate or platen 14 is appropriately supported from the frame 13 above the aperture 12 to support a master document 15 which is laid face downwards thereon to be copied on the xerographic drum 1. A web of graphic data bearing overlays 16 is wound about a pair of rollers 17 and 18 each of the rollers being positioned at one end of the transparent plate 14 to feed and wind the overlay web 16 as it passes below the platen 14 and over the aperture 12. An electric motor 19 is provided to drive rollers 17 and 18 for moving the overlay web beneath the transparent platen such that a preselected overlay on the web 16 can be positioned at the copying machine aperture to project a composite image of the overlay and the master document onto the xerographic drum 1.

Figure 3:
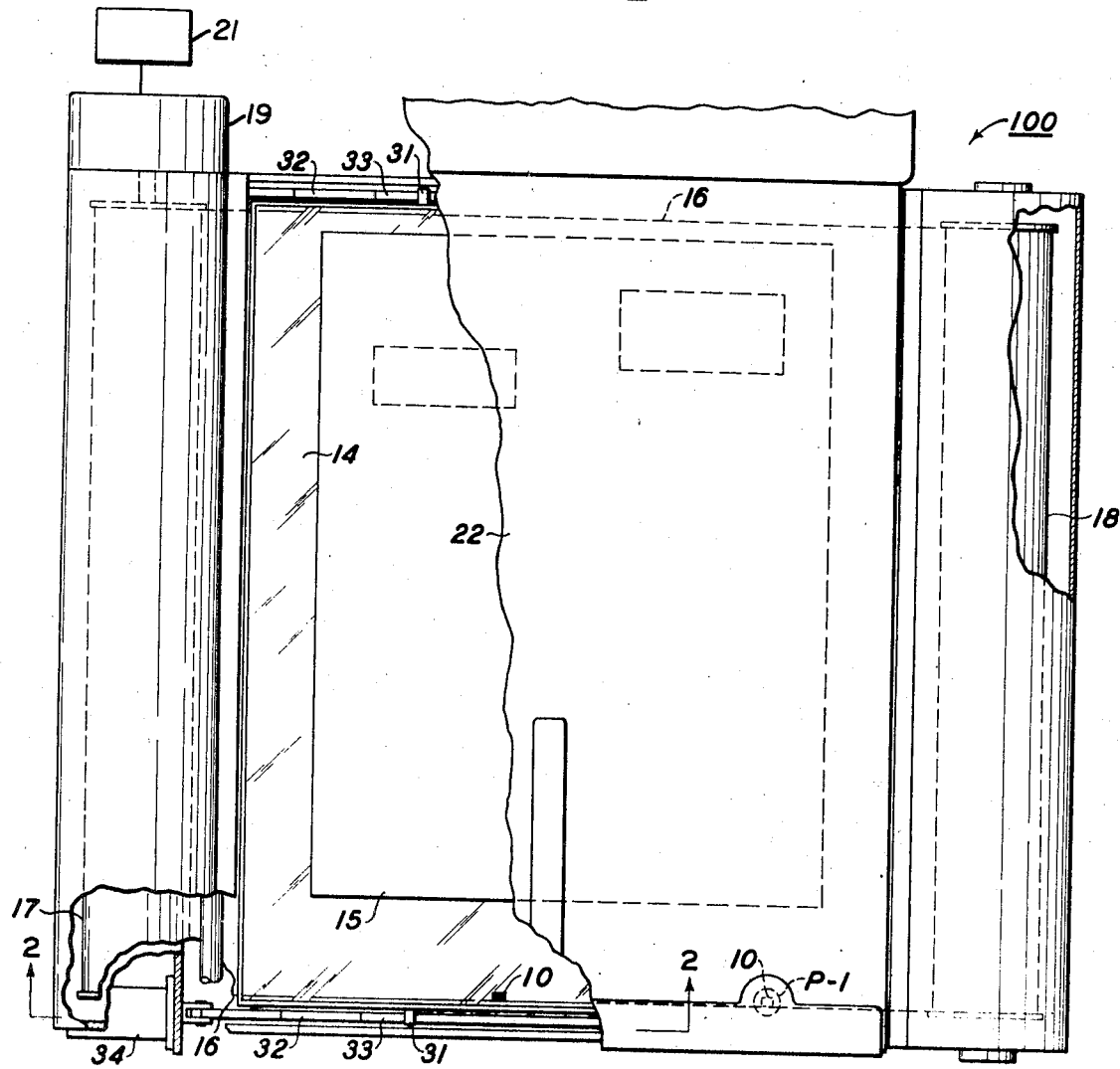
FIG. 3 is a horizontal profile view of the invention of this application to better illustrate the features thereof.

The overlay web 16 is formed from a number of individual overlays joined together. Each graphic information bearing overlay is printed on a transparent film such as a polyester film, to add or subtract the required information to or from the master document 16. As shown in FIG. 3, the transparent platen 14 is mounted on four rods 31 which rest on two cam bars 32 (one of which is shown) which are movable longitudinally by means of a solenoid 34. The cam bars 32 are each formed with two inclined slides 33, shaped such that when the rods 31 rest in the bottom of the slots 33, the transparent platen 14 rests on the overlay and keeps it firmly in position over the aperture 12. When the solenoid is energized the actuator moves the cam bars 32 to their other position and the rods 31 supporting the platen 14 are lifted onto the upper parts of the cam bars 32 so that the transparent platen is lifted clear of the aperture and the overlay web 16 can move between the platen and the aperture frame without rubbing. This lifting of the transparent platen 14 from the overlay web 16 relieves undue tension on the web when it is moved to present another preselected overlay for copying, and also prevents scratching of the graphic data bearing film.

Along one side of the web is a control band 10 of alternating transparent and opaque regions, which cooperate with a light source LMP and a photoelectric cell P-1 positioned one on each side of the web. When the web 16 is being moved to present another overlay for copying, the band will change from transparent to opaque or vis-versa when the overlay is in the correct position for copying. The change in output from the photoelectric cell P-1 is coupled to the motor 19 for driving the web overlay and also to operate the solenoid 34 to move the cam bars 32 to lower the platen 14 so that the document and overlay are in position for copying. The overlay web 16 is under a slight tension, so that it does not sag from the platen 14. At the end of the copying operation, the solenoid 34 is again operated to move the cam bars 32 to raise the transparent platen, and after a short delay to allow the transparent platen 14 to be raised, the motor 19 is reenergized to advance the overlay web 16 to the next desired position.

A motor drive to the web rollers 17 and 18 is illustrated diagrammatically in FIG. 1. In practice, the two web rollers 17 and 18 are respectfully driven by means of belts from pulleys whose positions are controlled by solenoids. Depending on the desired direction of drive, one or the other drive pulley is lowered by means of its solenoid into contact with a disc rotated by the motor 19. The arrangement is such that the two pulleys can be lowered one at a time into contact with the diagrammatically opposite portions of the rotating disc, so that the web will be wound on or back depending on which pulley is in contact with the disc. However, a suitable reversible electric motor 19 may also be used.

A programmer, generally indicated at 21 in FIG. 3, is used to control the operation of the document presentation apparatus and also of the copying machine. The programmer includes a number of switches, one for each overlay on the web. When copies are required from particular overlays in the web, the respective switches are operated, and electrical connections are thereby made so that the web will be wound on to present each of the selected overlays in turn over the aperture and when each of the overlays is presented, the platen 14 will be dropped into the copying position to press the overlay 16 into position over the aperture. The programmer 21 is also provided with a number of sliders, one for each overlay, each slider being movable to a position corresponding to the number of copies to be made from that overlay. After the required number of copies has been made, the platen will be lifted from the copying position and the motor 19 restarted to wind the web on to present the next overlay for copying.

In machines were a lower charge is made for multiple copies from a given document than for a single or few copies from a given document, such as that described in copending application "Xerographic Reproducing Apparatus" Ser. No. 451,730 filed Apr. 29, 1965 in the name of R. W. Morrill et al., means are provided to prevent change of the master document in the device without resetting the charging mechanism to the higher rate of charging. In one instance, the resetting of the charging mechanism is operated by lifting a cover 22 over the copying aperture of the machine, and this cover will also be fitted over the master document 15 on the document support 14 of the present device. Lifting of the cover to substitute a new original document will cause the charging mechanism to reset to its high rate of charging. To prevent another document being slipped under the platen cover 22 or under the document support 14 or under the overlay web 16, a channel is provided for enclosing the sides of the overlay.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A document presentation device for use with a document reproducing machine having a copying aperture over which a master document to be reproduced is placed comprising:
    means for supporting a master document over the copying aperture of a document reproducing machine,
    a web comprising a plurality of overlays one of which is to be reproduced with the master document,
    means for supporting the overlay with one overlay positioned between the master document and the aperture of the copying machine for making a composite image of the master document and the overlay,
    electrical means for driving the web to move preselected overlays into position between the master document and the aperture, and
    an electrical control means associated with said overlay web for indicating the position of the overlay web relative to the aperture.

2. The apparatus of claim 1 wherein said document supporting means comprises a transparent platen position between the master document and the overlay web.

3. A document presentation device for use with a document-reproducing machine having a copying aperture over which a master document to be reproduced is placed comprising:
    means for supporting a master document over the copying aperture of a document reproducing machine,
    a web comprising a plurality of overlays one of which is to be reproduced with the master document,
    means for supporting the overlay web with one overlay positioned between the master document and the aperture of the copying machine for making a composite image of the master document and the overlay,
    means for driving the web to move preselected overlays into position between the master document and the aperture,
    control means for indicating the position of the overlay web relative to the aperture said control means including a band of opaque and transparent regions carried on the overlay web, and
    means to sense changes between the opaque and transparent regions to control the means for driving the web.

4. The apparatus of claim 3 wherein said means to sense changes between the opaque and transparent regions on said overlay web includes a source of electromagnetic radiation emission and a sensor responsive to changes in the electromagnetic radiation emitted from said source to said sensor.

5. A document presentation device for use with a document reproducing machine having a copying aperture over which a master document to be reproduced is placed comprising:
    means for supporting a master document over the copy aperture of a document reproducing machine,
    a web comprising a plurality of overlays one of which is to be reproduced with the master document,
    means for supporting the overlay with one overlay positioned between the master document and the aperture of the copying machine for making a composite image of the master document and the overlay, said document supporting means comprising a transparent platen positioned between the master document and the overlay web, means for driving the web to move preselected overlays into position between the master document and the aperture, and means to move the transparent platen into and out of contact with the web overlay.

6. The apparatus of claim 5 wherein said means to move the transparent platen into and out from contact with the web overlay includes a pair of cam bars having rise and fall portions for supporting said platen, and a solenoid actuable upon energization to move said cam bars longitudinally relative to said transparent platen for moving said platen into and out from contact with said web overlay.

* * * * *